(12) United States Patent
Rocznik et al.

(10) Patent No.: US 8,125,280 B2
(45) Date of Patent: Feb. 28, 2012

(54) METHOD FOR REGULATING AN EXCITED OSCILLATION

(75) Inventors: Marko Rocznik, Cupertino, CA (US); Dayo Oshinubi, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 12/589,266

(22) Filed: Oct. 20, 2009

(65) Prior Publication Data

US 2010/0127785 A1 May 27, 2010

(30) Foreign Application Priority Data

Nov. 24, 2008 (DE) .......................... 10 2008 044 000

(51) Int. Cl.
*H03L 5/00* (2006.01)
(52) U.S. Cl. .................... 331/106; 331/116 M; 331/154; 324/658; 73/504.12; 73/504.16; 73/504.04; 73/514.32
(58) Field of Classification Search .............. 73/504.04, 73/504.12, 504.16, 514.32; 324/658; 331/106, 331/116 M, 154
See application file for complete search history.

(56) References Cited

U.S. PATENT DOCUMENTS

| | | | | |
|---|---|---|---|---|
| 7,159,461 | B2 * | 1/2007 | Gallon et al. | 73/504.12 |
| 7,523,665 | B2 * | 4/2009 | Katsumata et al. | 73/514.32 |
| 7,839,227 | B2 * | 11/2010 | Schwarz et al. | 331/154 |
| 2001/0022107 | A1 * | 9/2001 | Kato et al. | 73/504.12 |
| 2005/0274181 | A1 * | 12/2005 | Kutsuna et al. | 73/504.12 |

\* cited by examiner

*Primary Examiner* — Arnold Kinkead
*Assistant Examiner* — Richard Tan
(74) *Attorney, Agent, or Firm* — Kenyon & Kenyon LLP

(57) ABSTRACT

In a method for regulating an excited oscillation of a system to a resonance case of the system, instantaneous values of the oscillating quantity are discretely recorded using one sampling frequency, and the sampling frequency is selected to be below twice a maximum frequency of the system. In addition, the following steps are provided: ascertaining an oscillation amplitude from the instantaneous values; regulating a control amplitude on the basis of the ascertained oscillation amplitude; specifying a control frequency on the basis of the control amplitude; generating a control oscillation in consideration of the control frequency; combining the oscillation amplitude and the control oscillation to form a control signal; and exciting the system in consideration of the control signal.

15 Claims, 9 Drawing Sheets

102 →

| d=f(Δx, Δy) | | Δy | | |
|---|---|---|---|---|
| | | >0 | =0 | <0 |
| Δx | >0 | -1 | 0 | +1 |
| | =0 | 0 | 0 | 0 |
| | <0 | +1 | 0 | -1 |

Fig. 8

METHOD FOR REGULATING AN EXCITED OSCILLATION

BACKGROUND OF THE INVENTION

1. Field of the Invention

The present invention relates to a method for regulating an excited oscillation of a system to a resonance case of the system.

2. Description of Related Art

To excite oscillatory systems and to regulate them to a resonance case of the system, it is necessary to record the excited oscillations of the system. If digital techniques are used for this purpose, the oscillations are sampled in a discrete process. In order to counteract errors made during sampling, a sampling frequency is used that is substantially greater than the maximum frequency, in particular, greater than double the maximum frequency of the excited system. This approach is considered to be an application of the Nyquist theorem. It prevents oscillations from being sampled too slowly, whereby an effect can occur, which, when evaluated, suggests that an oscillation having a substantially lower frequency has been recorded, although this is not the case. This is generally referred to as aliasing. In particular, it is not possible in such cases to ascertain the actual frequency and phase relation of the sampled oscillation. The inherent drawback is that a constantly very high sampling frequency must be used, thereby resulting in substantial computational outlay for a recording device that is used. This substantial computational outlay is reflected in a high demand for chip surface area when the recording device is realized as an integrated circuit, and in a substantial power consumption.

Regulating systems which employ the method can be used, in particular, for systems such as ESP (electronic stability program), ROM (roll-over mitigation), EAS (electronic active steering), ASC (active suspension control), SbW (steer by wire) and other vehicle stability applications. This is due to the fact that what are generally referred to as inertia sensors are used as rotation-rate sensors. These typically have at least one part, a component, that is set into oscillation in response to excitation and that produces a Coriolis effect in response to a rotation of the sensor. This allows a relative movement to be measured between the oscillating portion and the remaining rotation-rate sensor. Other fields of applications of such sensors include NC applications, such as navigation, man-machine interfaces, game consoles, and sport and medical fields. These sensors must meet stringent requirements, in particular, in terms of a substantial computing capacity, a high level of stability, a minimal chip surface area and a low power consumption.

There is a need for a method which will reduce the computational outlay required for such a device and, in particular, thereby minimize the demand for chip surface area and reduce power consumption as well.

BRIEF SUMMARY OF THE INVENTION

The present invention provides a method for regulating an excited oscillation of a system to a resonance case of the system, instantaneous values of the oscillating quantity being discretely recorded using one sampling frequency, and the sampling frequency being selected to be below twice a maximum frequency of the system, including the following steps: Ascertaining an oscillation amplitude from the instantaneous values, regulating a control amplitude on the basis of the ascertained oscillation amplitude, specifying a control frequency on the basis of the control amplitude, generating a control oscillation in consideration of the control frequency, combining the oscillation amplitude and the control oscillation to form a control signal, and exciting the system in consideration of the control signal. By employing the described method, the sampling frequency may be kept below twice the maximum frequency of the system, thereby making it possible to save a great deal of computing capacity since it will merely be necessary to record the oscillation amplitude. Given a realization as an integrated circuit, it is possible in this manner to economize on chip surface area and to minimize the power requirement of such a device. In spite of violating the Nyquist theorem, the functionality of the system is ensured by such a regulation as is applied by the method. In particular, it is provided for a digital sampling to be carried out. It is especially advantageous that the method regulate a frequency and a phase relation of the control signal. Thus, in the context of the method, two initially separate control paths are derived, which are merged. On the one hand, the control amplitude is regulated on the basis of the ascertained oscillation amplitude and, on the other hand, the control oscillation, preferably a normalized control oscillation, is regulated in the frequency, as well as in the phase relation thereof by the control amplitude. The combination of the control amplitude and the control oscillation yields the control signal which is used for exciting the system. This method is based on the requirement that the system be operated in its resonance case and that, in the resonance case, the control amplitude assume a specific, preferably known, value. Thus, the method according to the present invention concerns a resonance control which uses an amplitude control to monitor the control frequency and, in this manner, regulates the control oscillation, so that the entire control loop and thus the oscillating system are in the resonance case.

Another refinement of the present invention provides for a spring-mass system to be used as a system. A spring-mass system has the advantage that its system response to an excitation is known and is able to be readily calculated. In addition, the quantities required for a calculation are able to be easily determined from the spring-mass system and measured.

One refinement of the present invention provides for at least one component of an inertia sensor, in particular of a rotation-rate sensor, to be used as a system. A rotation-rate sensor typically has at least one component that is set into oscillation. In response to a rotation of the entire rotation-rate sensor, a Coriolis force acts on this component, whereby a relative rotational movement is induced between the component and the remaining rotation-rate sensor. Using a suitable sensor system, such as a capacitive and/or piezoelectric sensor system, for example, this rotational movement may be recorded and properly evaluated. Using this sensor system, the excited oscillation of the component of the rotation-rate sensor may likewise be measured and recorded in the form of instantaneous values. Since the components within rotation-rate sensors oscillate at a very high frequency, even a small reduction in the required sampling frequency results in a substantial improvement in computational outlay and in the power consumption needed for regulating the excited oscillation of the component of the rotation-rate sensor. Particularly when working with multiaxial sensor cores, thus rotation-rate sensors, which have a plurality of components oscillating in the direction of a plurality of spatial axes, the computational outlay is reduced by a multiplex operation. It is particularly advantageous to sample the instantaneous values using a capacitive micromechanical sensor system, since these types of sensors are already known and are frequently used. Thus, the already existing advantages of such a sensor system may be combined with the advantages of the method according to the present invention. Particularly in connection with rotation-rate sensors, a significant reduction in the power requirement is achieved in evaluation units, such as AsiCs, for example, of drive and detection circuits, for exciting the oscillation. In this context, the multiplex operation relates, in particular, to the use of a converter stage for a plurality of sensor axes. Moreover, better conditions are obtained for a multiplex operation of the converter stage for a plurality of sensor axes, such as, for example, larger time windows for switching operations due to the reduced sampling frequency. In addition, by regulating to the resonance case, it is ensured that the system is always operated at an energetic optimum, resulting in a high- or low-grade system.

To ascertain the oscillation amplitude on the basis of the instantaneous values, another refinement of the present invention provides for a sinusoidal characteristic to be calculated for the instantaneous oscillation and for the amplitude of the sinusoidal characteristic to be used as the oscillation amplitude. In particular, to calculate the sinusoidal characteristic, it is provided in this case to interpolate between the instantaneous values.

One refinement of the present invention provides for the control frequency to be regulated using the control amplitude as a regulating variable. The control amplitude is already known from the regulation of the control amplitude, which is why it is beneficial and simplifying to continue to use this value. The relationship between the control amplitude and the control frequency is derived from the need to regulate the system to a resonance case.

Another refinement of the present invention provides for an extreme value of the control amplitude to be used as a setpoint value for the control amplitude. This extreme value may be ascertained in the preliminary stages by analysis and/or from measurements of the system behavior which indicate different control amplitudes. By specifying the resonance case, an extreme value is made available for the control amplitude that may be used as a setpoint value. The inference may also be made that when the control amplitude assumes the extreme value, the system is in the resonance case.

Another refinement of the present invention provides that a minimum possible value of the control amplitude, which is required to maintain the oscillation of the system in the resonance case, be used as an extreme value.

Yet another refinement of the present invention provides that a characteristic curve and/or a characteristic map be used to regulate the control amplitude to the extreme value. The use of a characteristic curve and/or of a characteristic map makes it possible to consider both linear, as well as non-linear behaviors of the system. In addition, desired regulation characteristics, such as transient reactions, may be specified in the preliminary stages.

One refinement of the present invention provides that the characteristic curve assign a change in the control amplitude over time to a change in the control frequency over time. This presupposes that a relationship between the control amplitude and the control frequency is known. This relationship may be measured in the preliminary stages or be analytically determined and stored in the characteristic curve so that a recorded change in the control amplitude is readily assignable to a change in the control frequency.

One refinement of the present invention provides that the characteristic map of the change in the control amplitude over time and a change in the frequency of the control oscillation over time be assigned to a change in the control frequency over time. The characteristic map has the same advantages as the characteristic curve. It is also advantageously possible that an inference regarding the control oscillation be included in the control. Thus, an additional variable is included that enhances the control accuracy of the method.

Another refinement of the present invention provides that a sinusoidal oscillation or a square-wave oscillation be used as a control oscillation. The square-wave oscillation may be produced in a simple manner, for example, by switching an electrical voltage on and off.

In accordance with another refinement of the present invention, a switch-on and/or switch-off control is provided that is only implemented by the method as needed. The advantage of this switch-on and/or switch-off control is that the power consumption may be additionally reduced, for example, in that a device for implementing the method is only used when it is needed.

The present invention also provides a device for regulating an excited oscillation of a system to a resonance case of the system, in particular, for implementing the method described above, having a sampling device having a sampling frequency for recording instantaneous values of the oscillation, the sampling frequency being below twice a maximum frequency of the system; having an oscillation-amplitude sensing device which ascertains an oscillation amplitude from the instantaneous values; a control-amplitude regulating device, which regulates the control amplitude on the basis of the oscillation amplitude; a control-frequency regulating device which regulates a control frequency of a control oscillation on the basis of the control amplitude; an oscillator, which generates the control oscillation on the basis of the control frequency; a combining device, which generates a control signal from the control amplitude and the control frequency; and an actuator which excites the system in consideration of the control signal.

Another refinement of the device provides that the system be an oscillating element, in particular, an oscillating frame of an inertia sensor, in particular of a rotation-rate sensor.

Another refinement of the present invention provides that the actuator be a comb drive. Electrostatic comb drives are classified under micromechanics. The principle of operation thereof is based on an action of force that is generated between two plate elements having different electrical charges.

BRIEF DESCRIPTION OF SEVERAL VIEWS OF THE DRAWING

FIG. 8 shows a characteristic map.

DETAILED DESCRIPTION OF THE INVENTION

Figure 1:
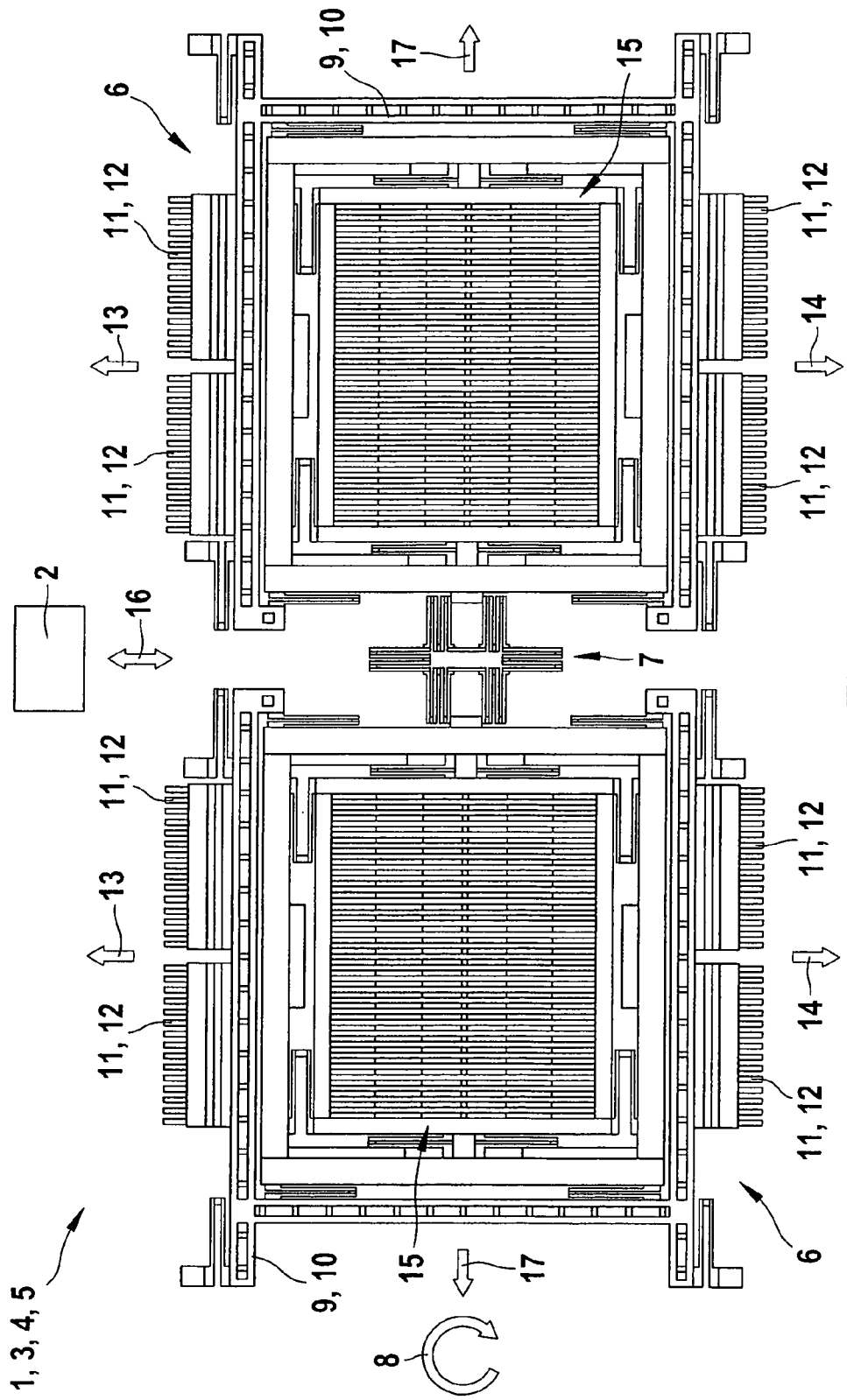
FIG. 1 shows a rotation-rate sensor having a device for regulating an excited oscillation.

FIG. 1 shows a system 1 that is regulated by a control and measuring device 2. System 1 is designed as a spring-mass system 3 in the form of an inertia sensor 4. Inertia sensor 4 is a rotation-rate sensor which, in response to a rotation, outputs a measurement signal which indicates the rate of rotation. For this purpose, inertia sensor 4 has two sensor modules 6 which have a similar design and are coupled to one another via a spring 7. Rotation-rate sensor 5 is rotated in the direction of an arrow 8, for example, to produce the measurement signal. Each of sensor modules 6 has an oscillating element 9 in the form of an oscillating frame 10. For the time segment needed to generate the measurement signal, oscillating element 9 may be excited to oscillate by actuators 11 in the form of comb drives 12. The excitation is carried out alternately in the directions of arrows 13 and 14. Displaceably configured in the direction of arrows 17 within oscillating elements 9 are detection elements 15 that interact with a capacitance-voltage transducer (not shown in FIG. 1). Control and measuring device 2 is bidirectionally connected via a signal path 16 to inertia sensor 4.

In response to a rotation of inertia sensor 4 excited by actuators 11, detection elements 15 are each deflected in the direction of one of arrows 17, thereby inducing capacitance-voltage transducer to generate the measurement signal and transmit the same via signal path 16 to control and measuring device 2. The actual rotation rate of inertia sensor 4 may be ascertained on the basis of this measurement signal. Oscillating elements 9 are excited by a regulation carried out by control and measuring device 2, which, via signal path 16, on the one hand, transmits a control signal to actuators 11 and, on the other hand, receives a return signal describing a position of the oscillating frame from actuators 11, which also render possible a sensing of the oscillation. Thus, described control and measuring device 2 assumes the task of controlling the oscillation of oscillating elements 9, as well as of recording the measurement signal which indicates the rotation rate of inertia sensor 4. It is also possible (not illustrated) for detection element 15 to be equipped with actuators allowing it to be set into oscillation, thereby making possible superpositions between the deflection resulting from rotation of inertia sensor 4 and a fundamental oscillation, for example.

Figure 2:
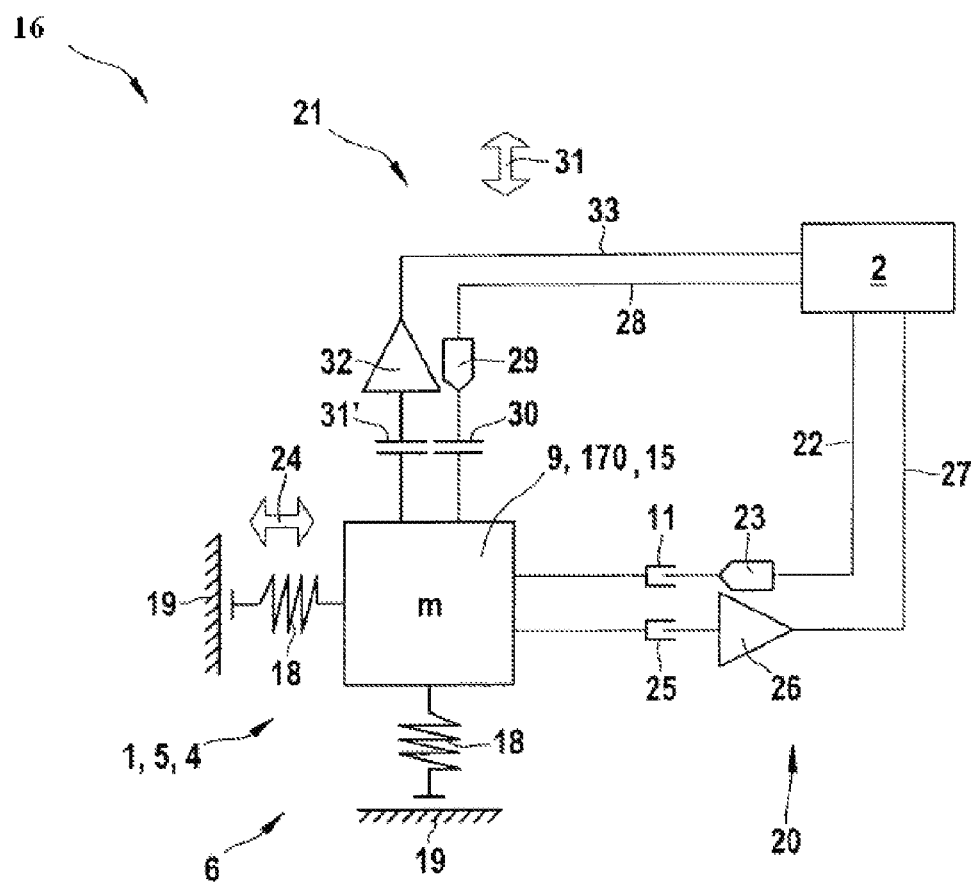
FIG. 2 shows an equivalent circuit diagram of the rotation-rate sensor having a device for regulating the excited oscillation.

FIG. 2 shows a part-sectional view of rotation-rate sensor 5 of FIG. 1 in a schematic representation. Oscillating element 9 and detection element 15 are combined in one mass element 170. FIG. 2 exemplarily shows the configuration of one of sensor modules 6. Mass element 170 is connected via two spring elements 18 to reference bearings 19. Thus, inertia sensor 4 measures the rotation rate of reference bearing 19 relative to its surroundings. Signal path 16 is shown in two parts in FIG. 2. It is composed of a drive path 20 and a detection path 21, which are both linked to control and measuring device 2. Drive path 20 has a signal path 22 for the control signal which leads to a converter 23 that actuates actuator 11. Actuator 11 excites mass element 170 alternately in the directions of double arrow 24. A measuring element 25 measures the resulting deflection of mass element 170 and transmits this signal via an amplifier 26 and a signal path 27 to control and measuring device 2. Thus, drive path 20 forms a closed control loop that includes control and measuring device 2 and mass element 170. Detection path 21 has a signal path 28 which leads to a converter 29. Converter 29 transmits a control signal arriving via signal path 28 to an actuator 30 which is able to deflect mass element 170 alternately in the directions of a double arrow 31. Signal path 28, converter 29, and actuator 30 are optional. A measuring element 31' measures the deflections of mass element 170 that are either in response to actuator 30 and/or to a rotation of inertia sensor 4. The measurement signal derived therefrom is transmitted via an amplifier 32 and another signal path 33 to device 2.

Figure 3:
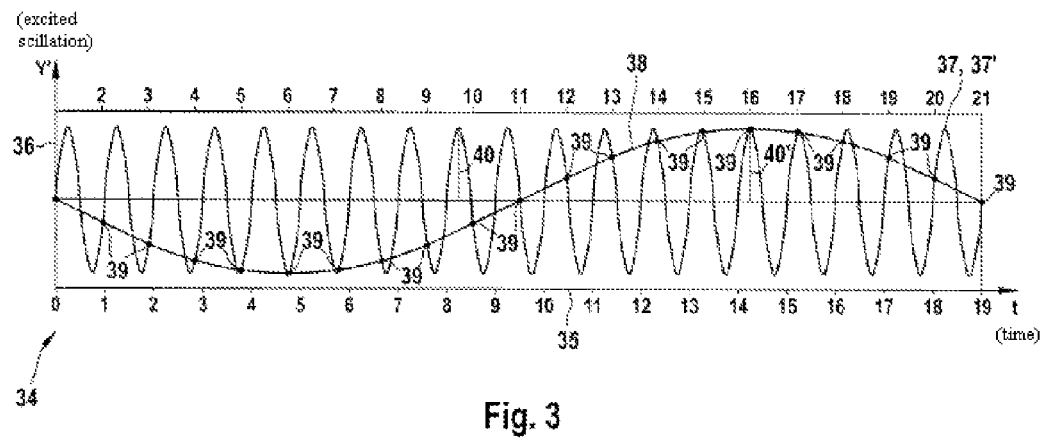
FIG. 3 shows a diagram including the excited oscillation, as well as instantaneous values and a sinusoidal characteristic.

FIG. 3 shows a diagram 34 having an abscissa 35 to which time t is assigned and an ordinate 36 to which an excited oscillation 37 is assigned. Within diagram 34, excited oscillation 37 is shown as a sinusoidal curve 37' that corresponds to the signal of measuring element 25. Situated above sinusoidal curve 37' is a sinusoidal characteristic 38 which has a lower frequency than sinusoidal curve 37'. Sinusoidal curve 37' represents the oscillation of system 1 of FIGS. 1 and 2. Sampling oscillation 37 at equally spaced time intervals using a sampling frequency yields instantaneous values 39. The sampling frequency is lower than twice a maximum frequency of system 1, so that it is not possible to fully record oscillation 37, and sinusoidal characteristic 38 is assumed self-evidently from instantaneous values 39. To complete sinusoidal characteristic 38, the intermediate values, which reside between instantaneous values 39, may be calculated by interpolation from instantaneous values 39. Thus, the procedure for recording sinusoidal curve 37' using the low sampling frequency leads to a loss of information on the phase relation and frequency of excited oscillation 37. The information on oscillation amplitude 40 of sinusoidal curve 37 remains, which is also correctly recorded in the sampling process using a low sampling frequency and corresponds to an amplitude 40' of sinusoidal characteristic 37. To implement a regulation of system 1 including a recording of oscillating quantity in the form shown in FIG. 3, the method employed must consider the information on phase relation and frequency of oscillation 37 for other purposes.

Figure 4:
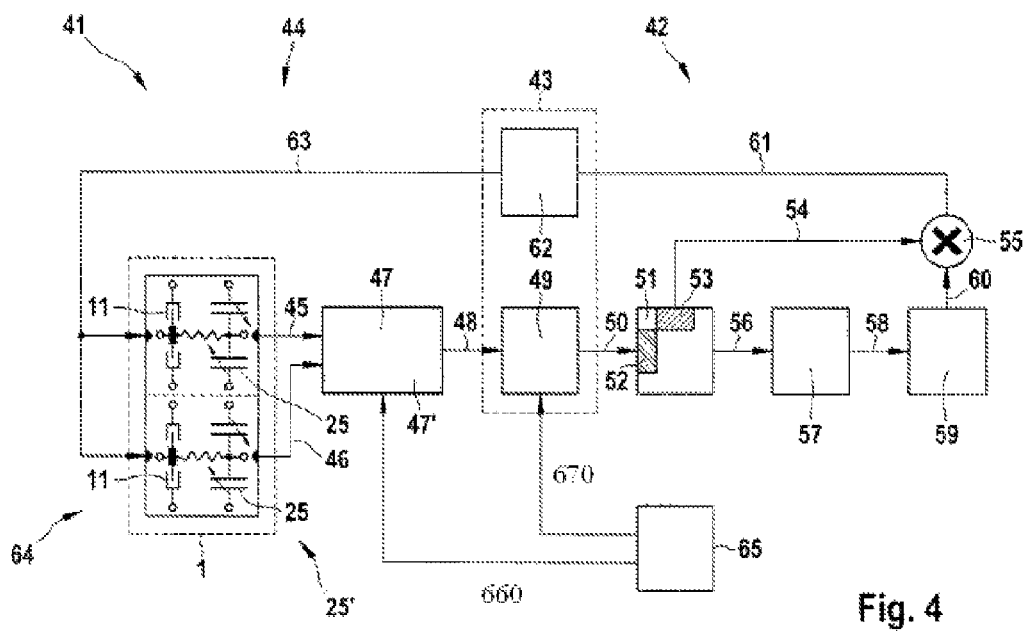
FIG. 4 shows the device for regulating the excited oscillation in a schematic representation.

FIG. 4 illustrates a device 41 for controlling system 1 of FIG. 1. System 1 is schematically shown in FIG. 4 on the basis of actuators 11 and measuring elements 25 that form a sampling device 25'. Device 41 has a digital region 42, a transitional region 43, as well as an analog region 44. Starting out from system 1 and its measuring elements 25, signal paths 45 and 46 extend to an analog measuring device 47. Analog measuring device 47 records the signals produced by measuring elements 25 and converts them into values of the oscillating quantity. In the case of capacitive measuring elements 25, this may be accomplished by a measuring device 47 in the form of a capacitance-voltage transducer 47'. Measuring device 47 transmits the processed signal via a signal path 48 to an analog-digital converter 49. The analog-digital converter ascertains instantaneous values 39 from the signal and transmits these via a signal path 50 to a control-amplitude regulating unit 51. Control-amplitude regulating unit 51 has an oscillation-amplitude sensing device 52, which ascertains the active oscillation amplitude from instantaneous values 39 and transmits it to a control-amplitude regulating device 53. The control amplitude ascertained by control-amplitude regulating device 53 is transmitted via a signal path 54 to a combining device 55. In addition, control-amplitude regulating unit 51 transmits the active control amplitude via a signal path 56 to a control-frequency regulating device 57, which, on the basis of the control amplitude, regulates a control frequency and specifies the same to an oscillator 59 via a signal path 58. From the control frequency, oscillator 59 generates a normalized control oscillation, i.e., an oscillation having a normalized amplitude that oscillator 59 transmits via a signal path 60 to combining device 55. The control oscillation is realized as sinusoidal oscillation. In combining device 55, the control amplitude is multiplied by the control oscillation, thereby yielding the control signal which is directed via a signal path 61 to a digital-analog converter 62. Digital-analog converter 62 generates an analog control signal that is transmitted via a signal path 63 to actuators 11 of system 1. Thus, a control loop 64, which allows system 1 to be regulated on the basis of recorded amplitude 40', is closed. Systems 1, which are illustrated in FIGS. 1 and 2, are provided as system 1. In addition, FIG. 4 shows a switch-on and/or switch-off control 65, which, via signal lines 660 and 670, is able to switch off measuring device 47, as well as analog-digital converter 49 and digital-analog converter 62. This is preferably carried out when system 1 is designed as rotation-rate sensor 4 and no measurement of the rotation rate is to take place. This makes it possible to save additional energy. It is conceivable that a switch-on and/or switch-off control 65 is able to switch other components on and/or off. It is also conceivable to only switch off measuring device 47 and analog-digital converter 49. In this case, the digital control signal is generated with a fixed amplitude and a fixed frequency.

Figure 5:
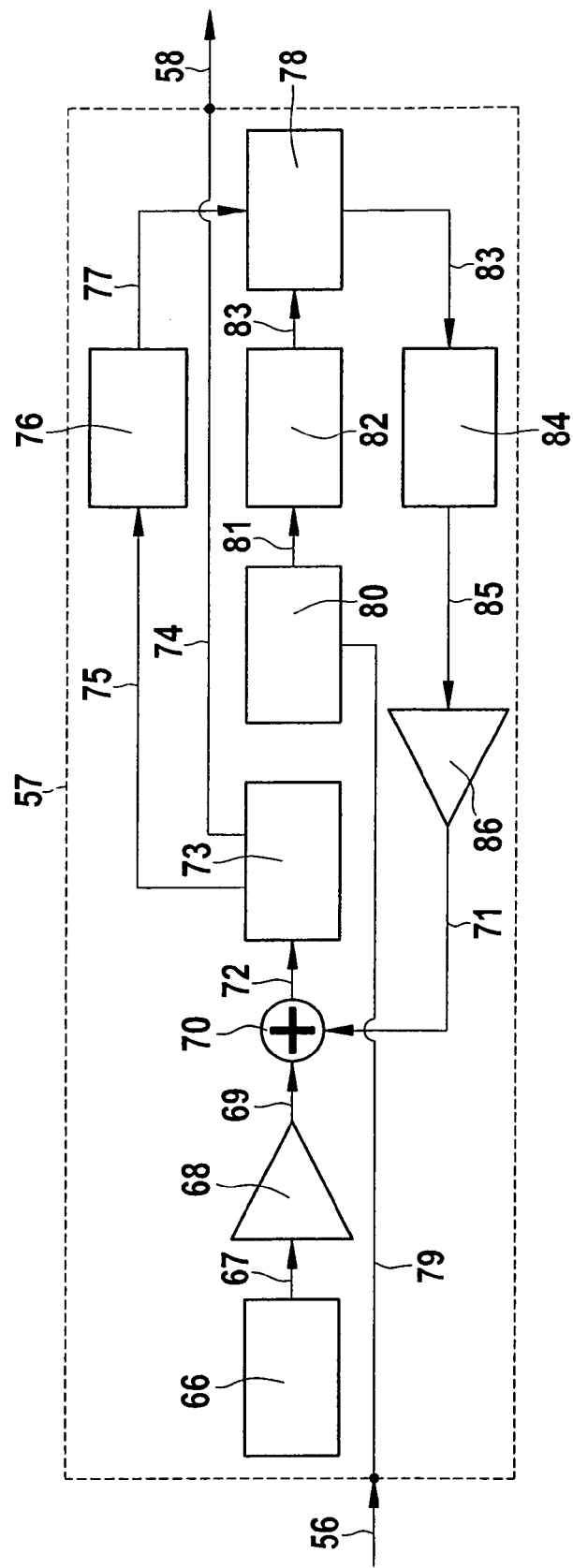
FIG. 5 shows a control-frequency regulating device in a schematic representation.

FIG. 5 shows control-frequency regulating device 57 of FIG. 4, to which the active control amplitude is fed via signal path 56 and which outputs the control frequency via signal path 58. Control-frequency regulating device 57 has a test signal generator 66 which transmits its test signal via a signal path 67 to an amplifier 68. The test signal is preferably an oscillating signal, however, it may also be a question of a jump function or a pulse function. The test signal is preferably generated in normalized form and may be adjusted in its characteristic via amplifier 68. The amplified test signal is transmitted via a signal path 69 to a summing device 70. Summing device 70 again receives a phase-modulation signal from another signal path 71 that is added to the amplified test signal. From this, a modulated test signal is derived that is transmitted via a signal path 72 to an output unit 73. Output device 73 transmits the modulated test signal as a control signal via a signal path 74 to signal path 58. In addition, via a signal path 75, output device 73 transmits the control frequency to a differentiator 76 which ascertains a change Δx in the control frequency and transmits the same via a signal path 77 to a decoder 78. Signal path 56 transmits the active control amplitude to a signal path 79 that leads to an input device 80. Starting out from input device 80, the control amplitude is transmitted via a signal path 81 to a differentiator 82 which ascertains a change Δy in the control amplitude over time and transmits the same via a signal path 83 to decoder 78. Decoder 78 contains a characteristic map 102. A change in the control frequency over time is assigned by characteristic map 102 to changes Δx and Δy. This change in control frequency is transmitted via a signal path 83 to an integrator 84 which integrates the change in the control frequency over time and transmits the signal via a signal path 85 to an amplifier 86. A phase-change increment may be adjusted in amplifier 86 by adapting the amplification factor of amplifier 86. It is particularly advantageous when the phase-change increment is adaptively matched in amplifier 86. Amplifier 86 is linked via signal path 71 to summing device 70 and thus delivers the phase-modulation signal.

Control-frequency regulating device 57 makes it possible for the control frequency to be regulated on the basis of the control amplitude and for the information on phase relation and the frequency of oscillation 37 to be indirectly considered to implement the regulation of system 1. This is possible under the condition that system 1 is to be regulated for its resonance case. Thus, for this control, the principle is derived that a test signal is transmitted by characteristic map 102 to entire control loop 64, and the test signal is modulated in such a way that the control amplitude is minimized, thus that it assumes a minimum possible value. Therefore, the minimized control amplitude forms the setpoint value. This results from the response characteristic of system 1 since it is designed as spring-mass system 3 and thus exhibits PT2 response which includes a resonance case.

Figure 6:
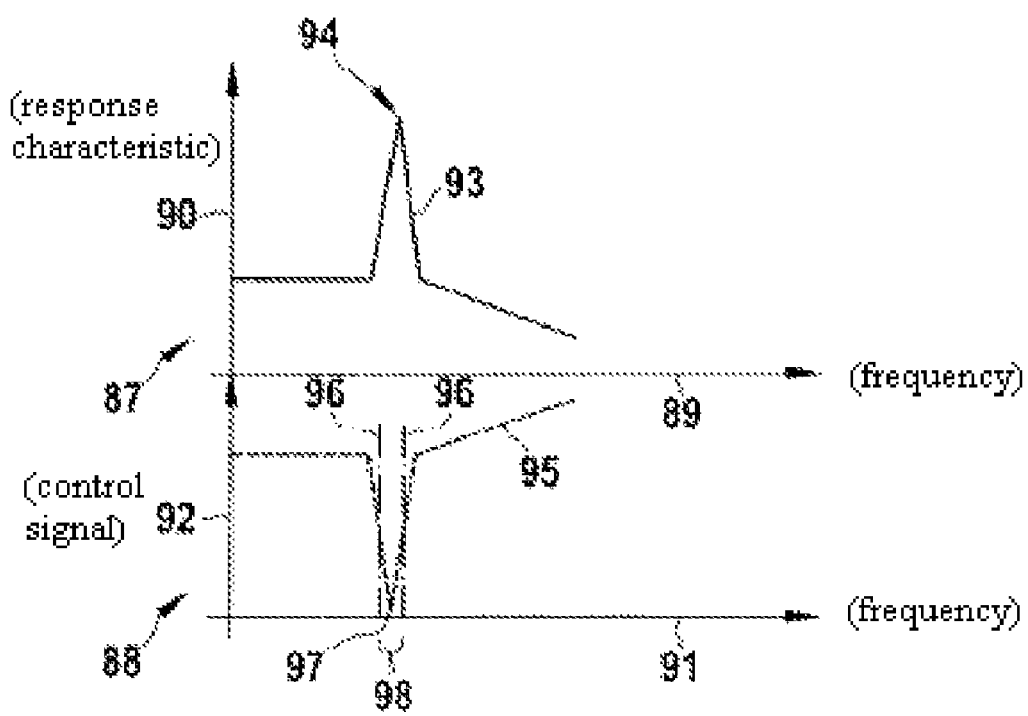
FIG. 6 shows diagrams illustrating the response characteristic of the rotation-rate sensor, as well as a frequency response characteristic of the control amplitude.

FIG. 6 shows a diagram 87 and a diagram 88. Diagram 87 has an abscissa 89 to which the frequency is assigned. In addition, diagram 87 has an ordinate 90 which describes the response characteristic of system 1. Diagram 88 likewise has an abscissa 92, to which the frequency is assigned, and an ordinate 92 which describes the control signal of control-amplitude regulating device 53. Within diagram 87, a curve 93 is shown which illustrates the response characteristic of system 1 over the frequency. Curve 93 has a maximum 94 which describes the resonance case of system 1. In diagram 88, a curve 95, shown as a dashed line, describes the characteristic of the control signal of control-amplitude regulating device 53 over the frequency. Curve 95 exhibits inverse properties relative to curve 94, so that a minimum 97, thus an extreme value, is formed for the resonance case of system 1. Two straight lines 96 describe a range around minimum 97, thereby specifying a possible setting range 98 for the control amplitude. To the extent possible, the control amplitude should reside within this setting range 98 since the resonance case of system 1 is completely or almost completely derived therefrom. Thus, by adjusting the control amplitude to within this setting range, the control-frequency regulating device is able to determine that the control frequency resides in the resonance case of system 1, both in phase and frequency. Curves 93 and 95 of FIG. 6 are illustrated qualitatively.

Figure 7:
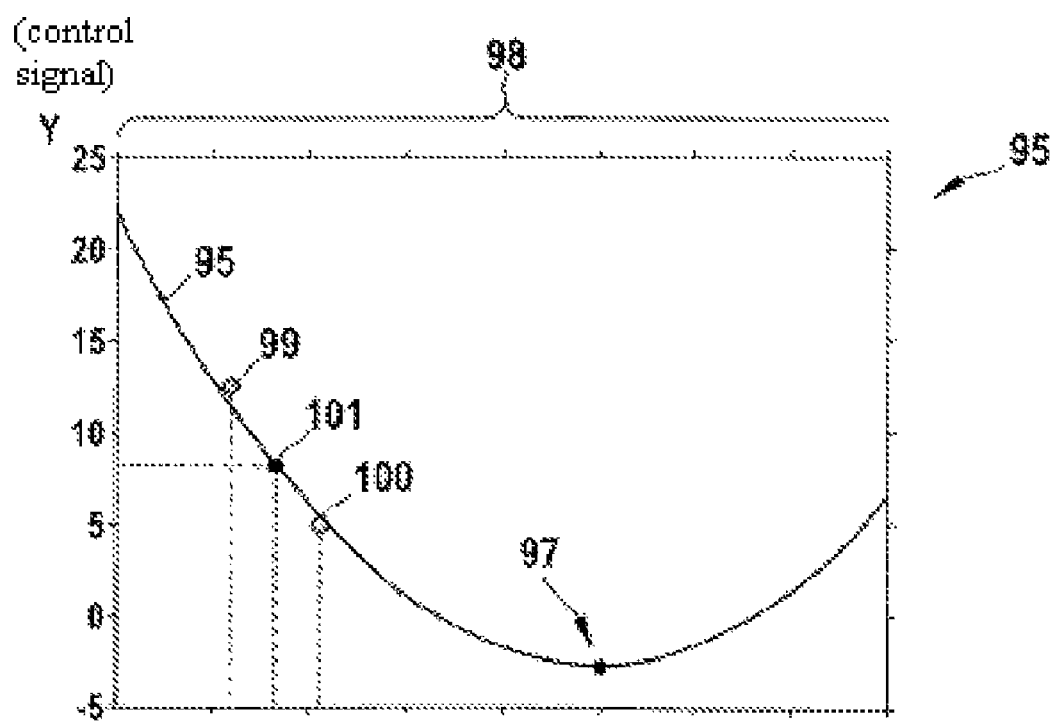
FIG. 7 shows a diagram illustrating the characteristics of the manipulated variable over the frequency.

FIG. 7 shows a detail of curve 95 from FIG. 6 in setting range 98. On curve 95, an active control frequency is denoted by a point 99, a control frequency following the active control frequency by point 100, and an available, desired control frequency by point 101.

Figure 8:
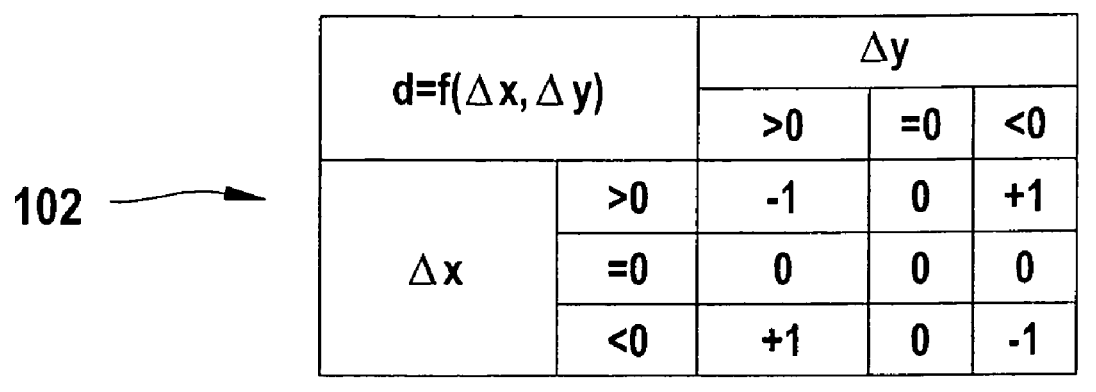

FIG. 8 shows a characteristic map 102 which specifies the change in the control frequency over time on the basis of changes Δx and Δy.

Figure 9:
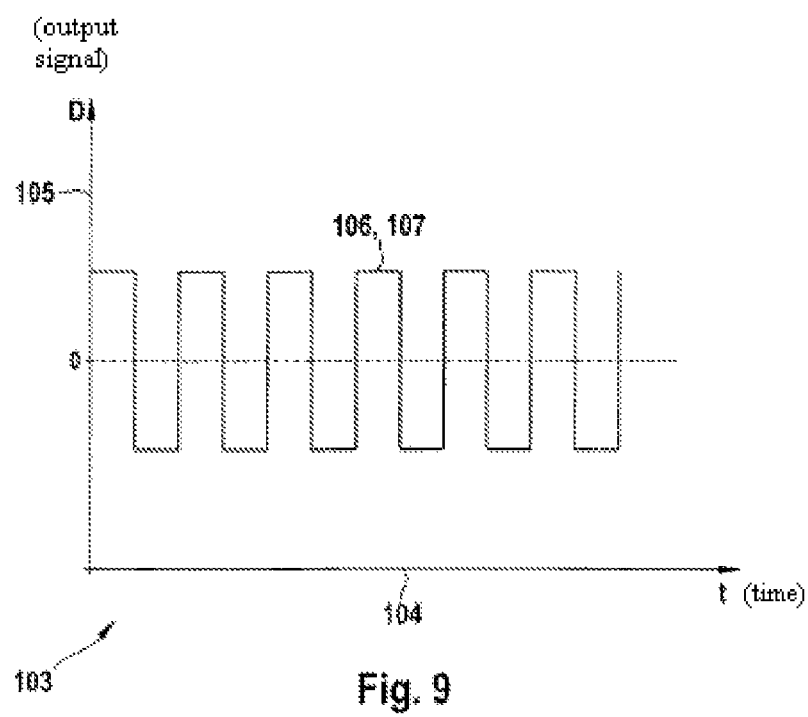
FIG. 9 shows a diagram illustrating an output signal of a decoder.

FIG. 9 shows a diagram 103 having an abscissa 104 which is assigned to time t and an ordinate 105 which is assigned to the output signal of decoder 78. Within diagram 103; a curve 106 is shown which is a square-wave curve 107 that oscillates.

The case illustrated in FIG. 9 for the values that are output from characteristic map 102 exists when the control frequency is to be retained in point 101. The control frequency of points 99 and 100 must be alternately assumed, whereby the oscillation of curve 106 results.

Figure 10:
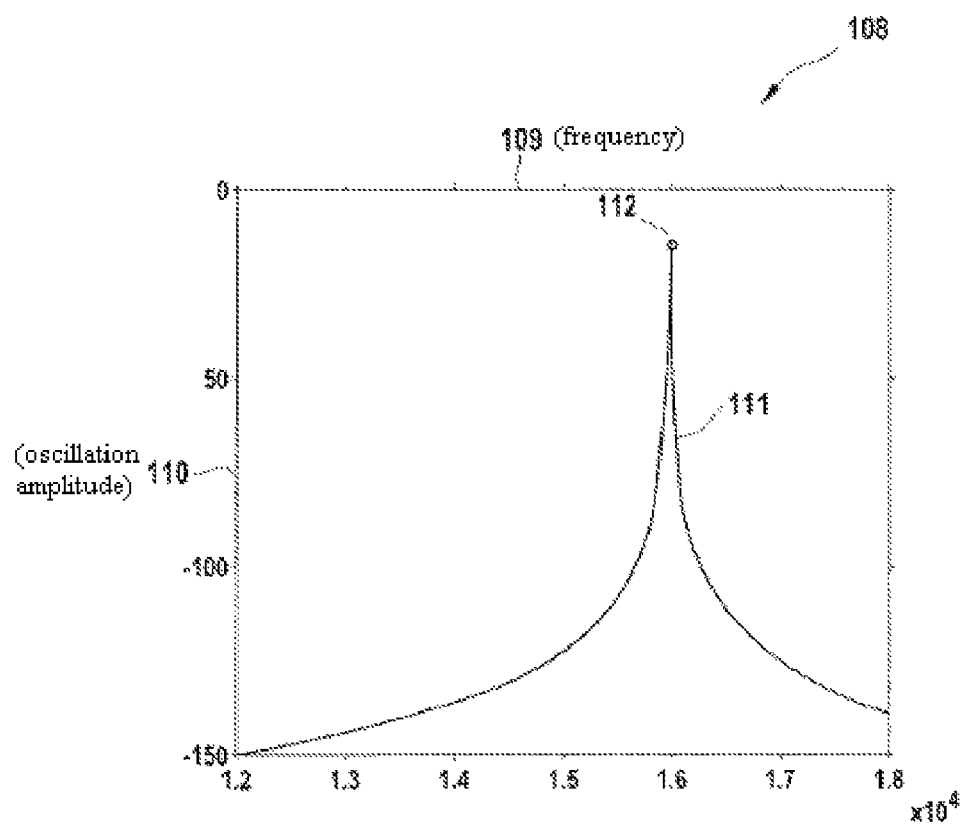
FIG. 10 shows a transfer function of the rotation-rate sensor.

FIG. 10 shows a response characteristic of system 1 in a part-sectional view in a diagram 108. Diagram 108 has an abscissa 109, to which the frequency is assigned, and an ordinate 110 to which the oscillation amplitude is assigned. Within diagram 108, a curve 111 is shown which describes the response characteristic of system 1. Curve 111 has a minimum 112 which represents the lowest possible amplitude of the excited oscillation of system 1 and thus indicates the resonance case.

Figure 11:
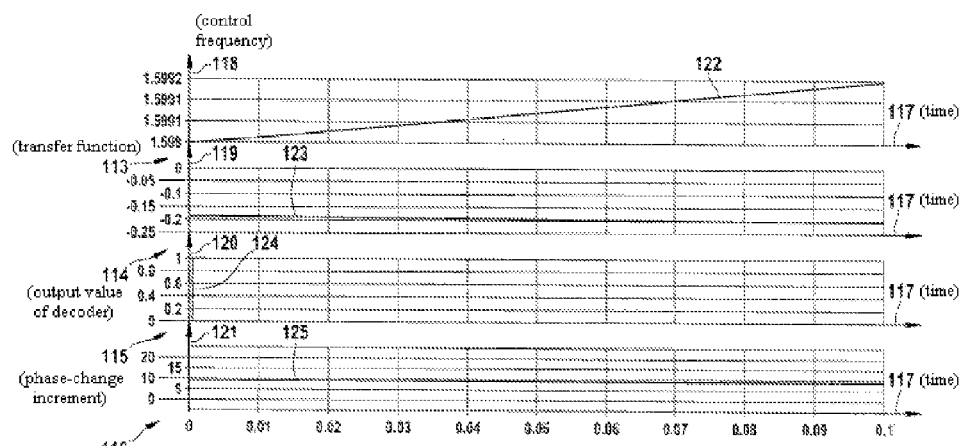
FIG. 11 shows simulation results without the adaptation of a phase-change increment having a small absolute value.
Figure 12:
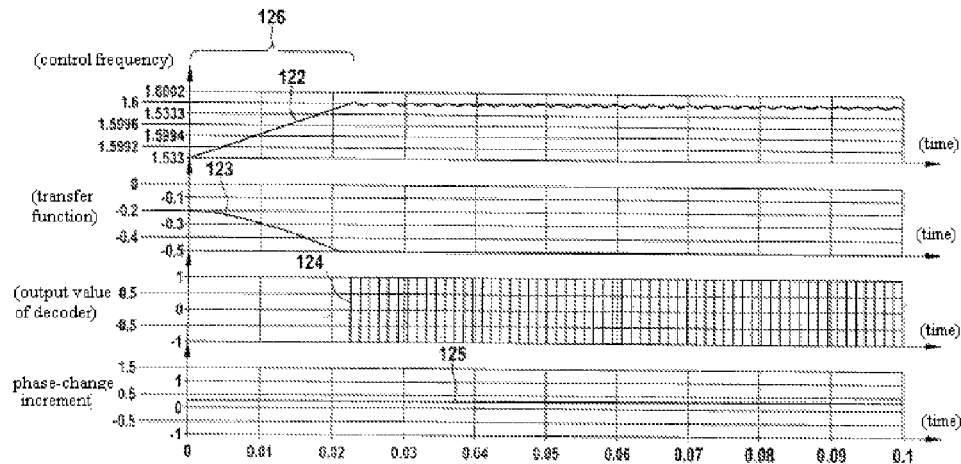
FIG. 12 shows simulation results without the adaptation of the phase-change increment having a large absolute value.
Figure 13:
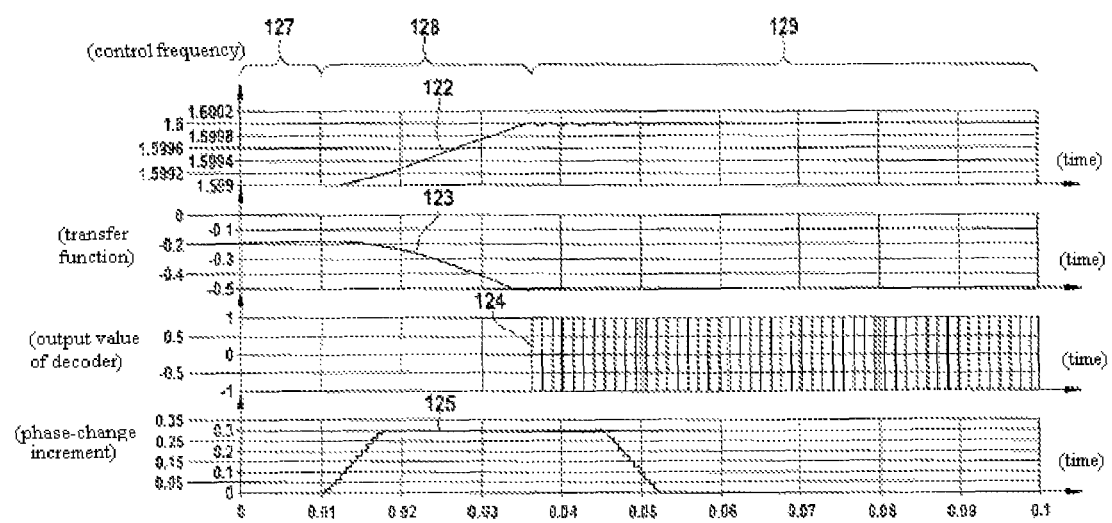
FIG. 13 shows simulation results including adaptation of the phase-change increment between the large and small absolute value.

FIG. 11 shows simulation results for control loop 64 illustrated in FIG. 4. FIGS. 11 through 13 each have diagrams 113, 114, 115 and 116. Diagrams 113, 114, 115 and 116 each have an abscissa 117 which is assigned to time t. Diagram 113 has an ordinate 118 which is assigned to the control frequency. Diagram 114 has an ordinate 119 to which the transfer function of system 1 is assigned. Diagram 115 has an ordinate 120 which is assigned to the output value of decoder 78, and diagram 116 has an ordinate 121 which describes the value of the phase-change increment of amplifier 86 of FIG. 5. A curve 122 illustrating the characteristic of the control frequency over time is plotted in diagram 113. A curve 123, which illustrates a characteristic of the value that the transfer function assumes over time, is shown in diagram 114. A curve 124, which shows the characteristic of the output signal of decoder 78, is shown in diagram 115. In diagram 116, a curve 125 is shown that describes the characteristic of the phase-change increment over time.

FIG. 11 shows simulation results that arise for the case that phase-change increment constantly has a low value (0.01 Hz). In this case, the resonance frequency of system 1, here 16 kHz, is completely reached. This occurs only very slowly due to the small phase-change increment. Curve 122 is ramp-shaped and ascends linearly. On the other hand, curve 123 descends gradually in a linear fashion, and curve 124 constantly has the value one since the frequency is to continuously rise. Curve 125 is likewise constant over the entire displayed time segment since it is a question of a constant phase-change step. A control is obtained that optimally achieves the resonant frequency.

FIG. 12 shows all the features of FIG. 11. FIGS. 12 and 11 differ in the shapes of curves 122, 123, 124 and 125. For the simulation results of FIG. 12, control loop 64 is adjusted in such a way that the phase-change increment is substantially greater than in FIG. 11, in this case 0.3 Hz. From this, it follows that curve 122 ascends very quickly in a first time segment 126 up to resonant frequency and subsequently oscillates around the resonant frequency. For curve 123, it follows in first time segment 126 that it drops very quickly to its minimum, in this case—0.5—and remains at this minimum. In time segment 126 at the front, curve 124 is initially constant and allows the control frequency to rise.

Following time segment 126 at the front, thus, after reaching the resonant frequency, the output signal of decoder 87 begins to oscillate in order to adjust the resonant frequency. Curve 125 likewise has a constant progression, as in FIG. 11, however, in this case with a value of 0.3 Hz.

Thus, a very rapid control is obtained, which has a frequency ripple component after reaching the resonant frequency.

FIG. 13 shows simulation results for control loop 64 whose phase-change increment is adapted. FIG. 13 shows all features of FIG. 11. FIGS. 13 and 11 differ in the shapes of curves 122, 123, 124 and 125. The characteristic of curve 122 shows a first time segment 127 in which the control frequency rises slowly. First time segment 127 is followed by a second time segment 128 in which the control frequency ascends quickly up to the resonant frequency. Once the resonant frequency is reached, a third time segment 129 follows in which curve 122, thus the control frequency, exhibits a transient response, and the control frequency optimally reaches the resonant frequency. In first time segment 127, curve 123 likewise has a constant progression and falls to its minimum within the second time segment. Within this minimum, curve 123 remains for the entire third time segment 129. The progression of curve 124 in the first and second segment 127 and 128 is constant. This means it produces a rise in curve 122, thus in the control frequency. In third time segment 129, the resonant frequency is reached by the control frequency, and the output signal of the decoder begins to oscillate, thereby inducing an oscillation of curve 124. In first time segment 127, curve 125 exhibits a constant progression. In second time segment 128, the value for the phase-change increment increases and is subsequently constantly maintained at a higher value. From this, the rise in curve 122 is derived in second time segment 128. Once the resonant frequency is reached by the control frequency in third time segment 129, this is recognized by the adaptation, and, within third time segment 129, the phase-change increment is made smaller and remains constant for the remainder of the third time segment.

Adapting the phase-change increment makes it possible to implement a very fast regulating device that produces an optimal control result. Only small phase shifts occur when this regulation is used.

What is claimed is:

1. A method for regulating an excited oscillation of a system to a resonance case of the system, comprising:
   recording discrete instantaneous values of an oscillating quantity using one sampling frequency, wherein the sampling frequency is selected to be below twice a maximum frequency of the system;
   ascertaining an oscillation amplitude from the instantaneous values;
   regulating a control amplitude on the basis of the ascertained oscillation amplitude;
   specifying a control frequency on the basis of the control amplitude;
   generating a control oscillation in consideration of the control frequency;
   combining the oscillation amplitude and the control oscillation to form a control signal; and
   exciting the system in consideration of the control signal.

2. The method as recited in claim 1, wherein the system is a spring-mass system.

3. The method as recited in claim 1, wherein the system is at least one component of a rotation-rate sensor.

4. The method as recited in claim 3, wherein, to ascertain the oscillation amplitude on the basis of the instantaneous values, a sinusoidal characteristic is calculated for an instantaneous oscillation, and wherein an amplitude of the sinusoidal characteristic is used as the oscillation amplitude.

5. The method as recited in claim 4, wherein the control frequency is regulated using the control amplitude as a regulating variable.

6. The method as recited in claim 5, wherein an extreme value of the control amplitude is used as a setpoint value for the control amplitude.

7. The method as recited in claim 6, wherein a minimum possible value of the control amplitude required to maintain the excited oscillation of the system in the resonance case is used as the extreme value.

8. The method as recited in claim 7, wherein at least one of a characteristic curve and a characteristic map is used to regulate the control amplitude to the extreme value.

9. The method as recited in claim 8, wherein the characteristic curve assigns a change in the control amplitude over time to a change in the control frequency over time.

10. The method as recited in claim 8, wherein the characteristic map assigns a change in the control frequency over time to a change in the control amplitude over time and to a change in the frequency of the control oscillation over time.

11. The method as recited in claim 4, wherein one of a sinusoidal oscillation or a square-wave oscillation is used as the control oscillation.

12. The method as recited in claim 4, wherein the method is selectively performed only when a switch control selects implementation of the method.

13. A device for regulating an excited oscillation of a system to a resonance case of the system, comprising:
- a sampling device having a sampling frequency for recording instantaneous values of an oscillating quantity, the sampling frequency being below twice a maximum frequency of the system;
- an oscillation-amplitude sensing device ascertaining an oscillation amplitude from the instantaneous values;
- a control-amplitude regulating device regulating a control amplitude on the basis of the oscillation amplitude;
- a control-frequency regulating device specifying a control frequency of a control oscillation on the basis of the control amplitude;
- an oscillator generating the control oscillation on the basis of the control frequency;
- a combining device generating a control signal from the control amplitude and the control oscillation; and
- an actuator exciting the system in consideration of the control signal.

14. The device as recited in claim 13, wherein the system is an oscillating frame of an inertia sensor.

15. The device as recited in claim 14, wherein the actuator is a comb drive.

* * * * *